US010165026B2

(12) United States Patent
Chiarulli et al.

(10) Patent No.: US 10,165,026 B2
(45) Date of Patent: *Dec. 25, 2018

(54) INTELLIGENT GENERATION AND DISTRIBUTION OF AN ENCODED CONTENT TRANSPORT STREAM ACCORDING TO METADATA

(71) Applicant: Disney Enterprises, Inc., Burbank, CA (US)

(72) Inventors: Michael V. Chiarulli, Summit, NJ (US); Todd Christiansen, Garden City, NY (US); David A. Dreispan, Cedar Knolls, NJ (US); Joseph P. Kenny, Floral Park, NY (US); Jerry A. Rapella, Belford, NJ (US)

(73) Assignee: Disney Enterprises, Inc., Burbank, CA (US)

( * ) Notice: Subject to any disclaimer, the term of this patent is extended or adjusted under 35 U.S.C. 154(b) by 1012 days.

This patent is subject to a terminal disclaimer.

(21) Appl. No.: 13/727,302

(22) Filed: Dec. 26, 2012

(65) Prior Publication Data

US 2014/0181263 A1 Jun. 26, 2014

(51) Int. Cl.
*G06F 15/16* (2006.01)
*H04L 29/06* (2006.01)
(Continued)

(52) U.S. Cl.
CPC ............ *H04L 65/60* (2013.01); *H04H 60/06* (2013.01); *H04H 60/73* (2013.01); *H04N 21/26266* (2013.01); *H04N 21/8126* (2013.01)

(58) Field of Classification Search
CPC ........................ H04L 67/1097; H04L 65/4069
(Continued)

(56) References Cited

U.S. PATENT DOCUMENTS 7,020,888 B2 3/2006 Reynolds
7,529,263 B1 5/2009 Sparrell
(Continued)

FOREIGN PATENT DOCUMENTS

JP 2002-118834 4/2002
JP 2002314976 10/2002
(Continued)

OTHER PUBLICATIONS

Japanese Office Action dated Dec. 2, 2014 for Japanese Patent Application No. 2013-265947.
(Continued)

*Primary Examiner* — Hua Fan
(74) *Attorney, Agent, or Firm* — Farjami & Farjami LLP (57) ABSTRACT

There is provided a method and system for generating and distributing an encoded content transport stream. The method comprises obtaining metadata and at least one unique identifier that identifies content elements, generating a recipient specific list using the metadata and at least one of the unique identifiers, creating a content transport stream using the recipient specific list including the metadata and the identified content elements, encoding the content transport stream to generate the encoded content transport stream, and distributing the encoded content transport stream through at least one network path. The metadata may include destination points and priority information of the encoded content transport stream, which may take the form of sections of television programming or block of commercial advertisements.

14 Claims, 4 Drawing Sheets

(51) Int. Cl.
*H04H 60/06* (2008.01)
*H04H 60/73* (2008.01)
*H04N 21/262* (2011.01)
*H04N 21/81* (2011.01)

(58) Field of Classification Search
USPC ........................................................ 709/219
See application file for complete search history.

(56) References Cited

U.S. PATENT DOCUMENTS

| | | | |
|---|---|---|---|
| 7,583,733 | B1 | 9/2009 | Zhang |
| 7,675,901 | B2 | 3/2010 | Wang |
| 7,808,918 | B2 | 10/2010 | Bugenhagen |
| 7,843,831 | B2 | 11/2010 | Morrill |
| 7,934,228 | B2 | 4/2011 | Miner |
| 7,987,464 | B2 * | 7/2011 | Day ..................... G06F 9/5077 710/260 |
| 8,018,934 | B2 | 9/2011 | Liu |
| 8,064,479 | B2 | 11/2011 | Assouline |
| 8,102,770 | B2 | 1/2012 | Morrill |
| 2002/0057799 | A1 | 5/2002 | Kohno |
| 2003/0079027 | A1 * | 4/2003 | Slocombe ............... H04L 29/06 709/229 |
| 2007/0094375 | A1 * | 4/2007 | Snyder .................. G06Q 10/06 709/223 |
| 2007/0244983 | A1 | 10/2007 | Berger |
| 2007/0261072 | A1 | 11/2007 | Boulet |
| 2008/0049637 | A1 | 2/2008 | Morrill |
| 2008/0049638 | A1 | 2/2008 | Ray |
| 2008/0049777 | A1 | 2/2008 | Morrill |
| 2008/0086754 | A1 * | 4/2008 | Chen ................. H04L 29/06027 725/105 |
| 2009/0003432 | A1 | 1/2009 | Liu |
| 2009/0106082 | A1 * | 4/2009 | Senti ..................... G06Q 30/02 705/7.33 |
| 2010/0180291 | A1 | 7/2010 | Kahn |
| 2011/0295978 | A1 | 12/2011 | Pazos |

FOREIGN PATENT DOCUMENTS

| | | |
|---|---|---|
| JP | 2004007196 | 1/2004 |
| JP | 2005223685 | 8/2005 |
| JP | 2009/094900 | 4/2009 |
| JP | 2009094900 | 4/2009 |
| JP | 2009/165058 | 7/2009 |
| JP | 2009278320 | 11/2009 |
| JP | 2014128030 | 7/2014 |
| KR | 1020040071599 A | 8/2004 |
| WO | WO 2011/150389 | 12/2011 |
| WO | WO 2012/170574 | 12/2012 |

OTHER PUBLICATIONS

Harris, "Video Networking Guide Connectivity Without Complexity" 2010, Internet Citation <http://www.broadcast.harris.com/media/videoNetworkingGuide_25-5591.pdf>.

Microsoft, "Delivering Live and On-Demand Smooth Streaming" 2010, Internet Citation <http://www.google.com/url?sa=t&rct=j&q=encoded%20audio%20video%20transport%20stream%20embedded%20data%20endpoint%20deliver%20television%20or%20tv%20or%20cable%20or%20broadcast&source=web&cd=6&ved=0CEQQFjAF&url=http%3A%2F%2Fdownload.microsoft.com%2Fd ownload%2F4%2FE%2F5%2F4E599FBB-6E34-4A74-B3C5-1391CB0FD55F%2FDelivering_Live_and_On-Demand_Smooth_Streaming.pdf&ei=YPcrT_GUOcec2AWW8rX4Dg&usg=AFQjCNFKwTEtcBv71tx6usXdVtqHNXoBIQ>.

Streambox, Inc., "Streambox ACT0—L2 Video Transport", 2003 Internet Citation <http://www.broadcastpapers.com/whitepapers/StreamboxACT-L2VideoTransport.pdf?CFID=22800372&CFTOKEN=95fcfaa56e1ca68d-43BB8A17-09F2-16AA-278800135DD556AD>.

"1st Report of EBU/SMPTE Task Force for Harmonized Standards for the Exchange of Television Program Material as Bit Streams", EBU Review—Technical, European Broadcasting Union. Brussels, BE, No. 272, Jun. 21, 1997 (Jun. 21, 1997), pp. 1-73, XP000720137, ISSN: 0251-0936.

* cited by examiner

INTELLIGENT GENERATION AND DISTRIBUTION OF AN ENCODED CONTENT TRANSPORT STREAM ACCORDING TO METADATA

BACKGROUND

Television programs, live sports, and other media content are delivered to consumers from broadcast and cable networks through regional, sales, or other affiliate endpoints. The broadcast and cable networks must choose the various versions of the media content to be delivered to the affiliate based on time zones, market clearances, regionalization, or other criteria. The broadcast and cable networks are further required to choose transport paths to ensure the media content arrives concurrently and efficiently. Therefore, the broadcast and cable networks must process a wide variety of data, ranging from regional commercial scheduling, time zone delays, sport clearances, and transport path health, to name a few, before the media content is delivered to affiliates.

At present, broadcast and cable networks require coordination of multiple systems in order to properly process and transmit the media content to affiliates. Often this is done manually by the broadcast and cable networks. Therefore, switching of the media content or the transport path must be controlled manually after observation of the affiliate needs. Furthermore, affiliates are often required to manually contact or otherwise alert the broadcast and cable networks if change is required. Thus, for example, continual adjustment must be made if a transport stream is impaired and media content is not arriving at the affiliate correctly or efficiently.

SUMMARY

The present disclosure is directed to intelligent generation and distribution of an encoded content transport stream according to metadata, substantially as shown in and/or described in connection with at least one of the figures, as set forth more completely in the claims.

DETAILED DESCRIPTION

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1:
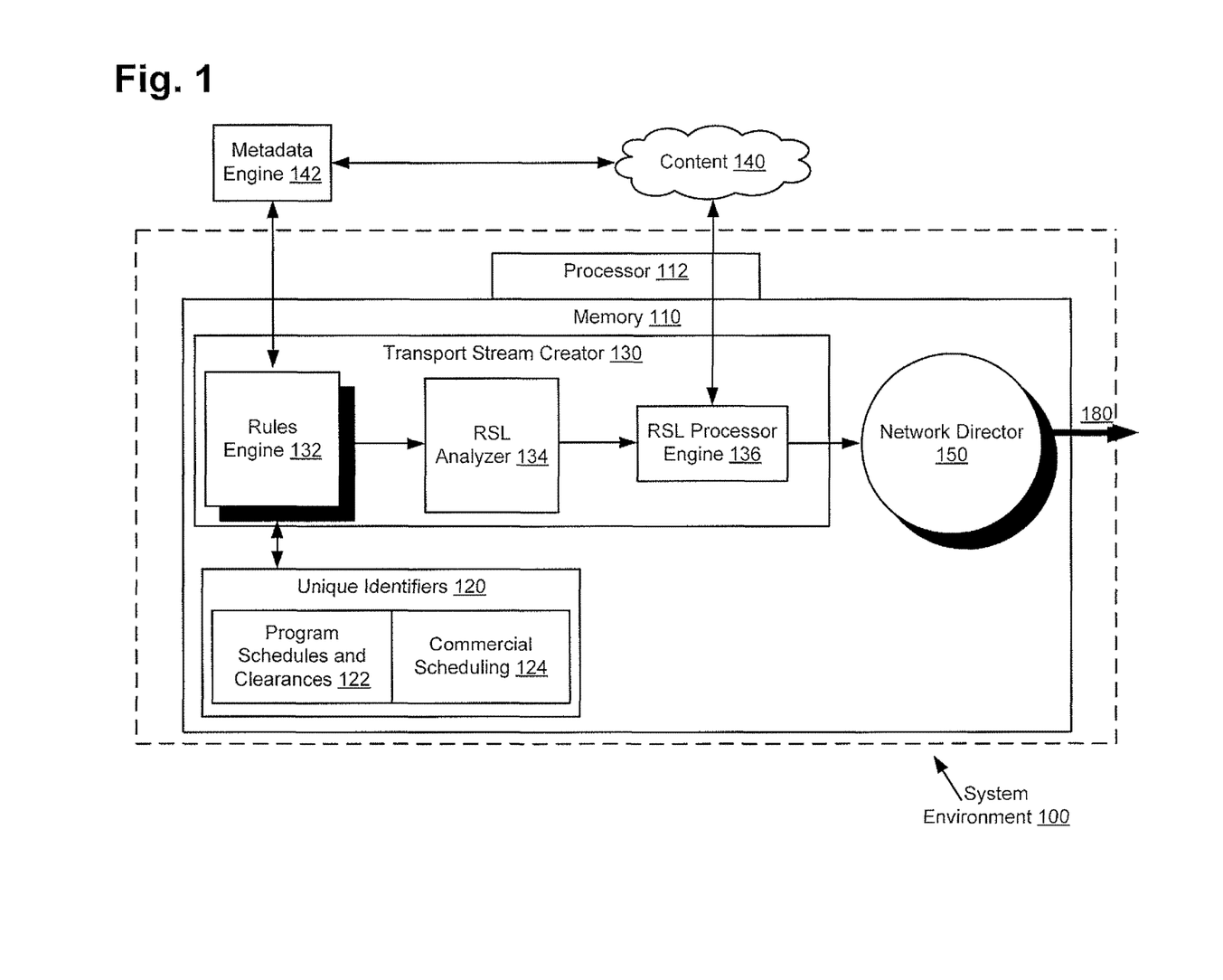
FIG. 1 presents a block diagram of an exemplary system generation and distribution of an encoded content transport stream according to metadata.

FIG. 1 shows a diagram of one exemplary implementation of a system for generating and distributing an encoded content transport stream from metadata. As shown in FIG. 1, system environment 100 includes processor 112 and memory 110 storing unique identifiers 120 composed of program schedules and clearances 122 and commercial scheduling 124, transport stream creator 130 composed of rules engine 132, recipient specific list (RSL) analyzer 134, and RSL processor engine 136, as well as network director 150 and network path 180. Also shown in FIG. 1 are metadata engine 142 and content 140.

System environment 100 illustrates a simplified system for generating and distributing an encoded content stream from metadata. Thus, alternative implementations may support multiple systems or servers for balancing and/or reduced latency. Furthermore, as used herein, a processor, such as processor 112, may refer to a single processor or a collection of more than one processor, e.g. microprocessor or a hardware processor. Similarly, memory 110 may refer to a single memory or a collection of more than one memory, such as a non-transitory memory or computer storage.

According to the implementation of FIG. 1, processor 112 may access memory 110 to execute transport stream creator 130 and network director 150. Processor 112 may execute rules engine 132 of transport stream creator to obtain metadata from metadata engine 142 and unique identifiers 120 (UID) identifying media content. Metadata engine 142 may process information from content 140. Content 140 may correspond to a content cloud containing media content, such as television media content, movie media content, recorded live media content, sports media content, music media content, or other media content. Metadata engine 142 may process content 140 and contain metadata related to the destination points of an encoded content transport stream, priority data to determine the priority of utilizing/playing an encoded content transport stream, an interrupt command to stop another encoded content transport stream, a name or location of an affiliate that receives the encoded content transport stream, a time to play the encoded content transport stream, a name of the encoded content transport stream, contents of the encoded content transport stream, or other metadata corresponding to the encoded content transport stream.

Unique identifiers 120 may contain program schedules 122 and commercial scheduling 124. Each unique identifier contained in unique identifiers 120 may identify a media content by scheduling requirements. Thus, program schedules 122 may correspond to unique identifiers 120 identifying programming media content, such as television, movie, music video, or audio programming content, by time schedules of programming media content, such as a regional time schedule for a broadcast channels media content, a national channel schedule for a national movie channel, a pay-per-view schedule of a pay-per-view channel, or other scheduling information corresponding to programming media content. Similarly, commercial scheduling 124 may correspond to unique identifiers identifying commercial media content, such as commercial advertisements, by regional advertising, national advertising, commercial scheduling, or other metadata corresponding to commercial media content.

After processor 112, executing rules engine 132 of transport stream creator 130, obtains metadata from metadata engine 142 and at least one UID 120, rules engine 132 may generate a recipient specific list (RSL) using the metadata and at least one UID 120. Next, processor 112 may execute RSL analyzer 134 of transport stream creator 130 to determine at least one RSL processor engine 136 to execute. After, processor 112 may execute RSL processor engine 136 of transport stream creator 130 to create and encode an encoded content transport stream using content from content 140. Processor 112 may then execute network director 150 to determine network path 180 to transmit the encoded media content stream.

Figure 2:
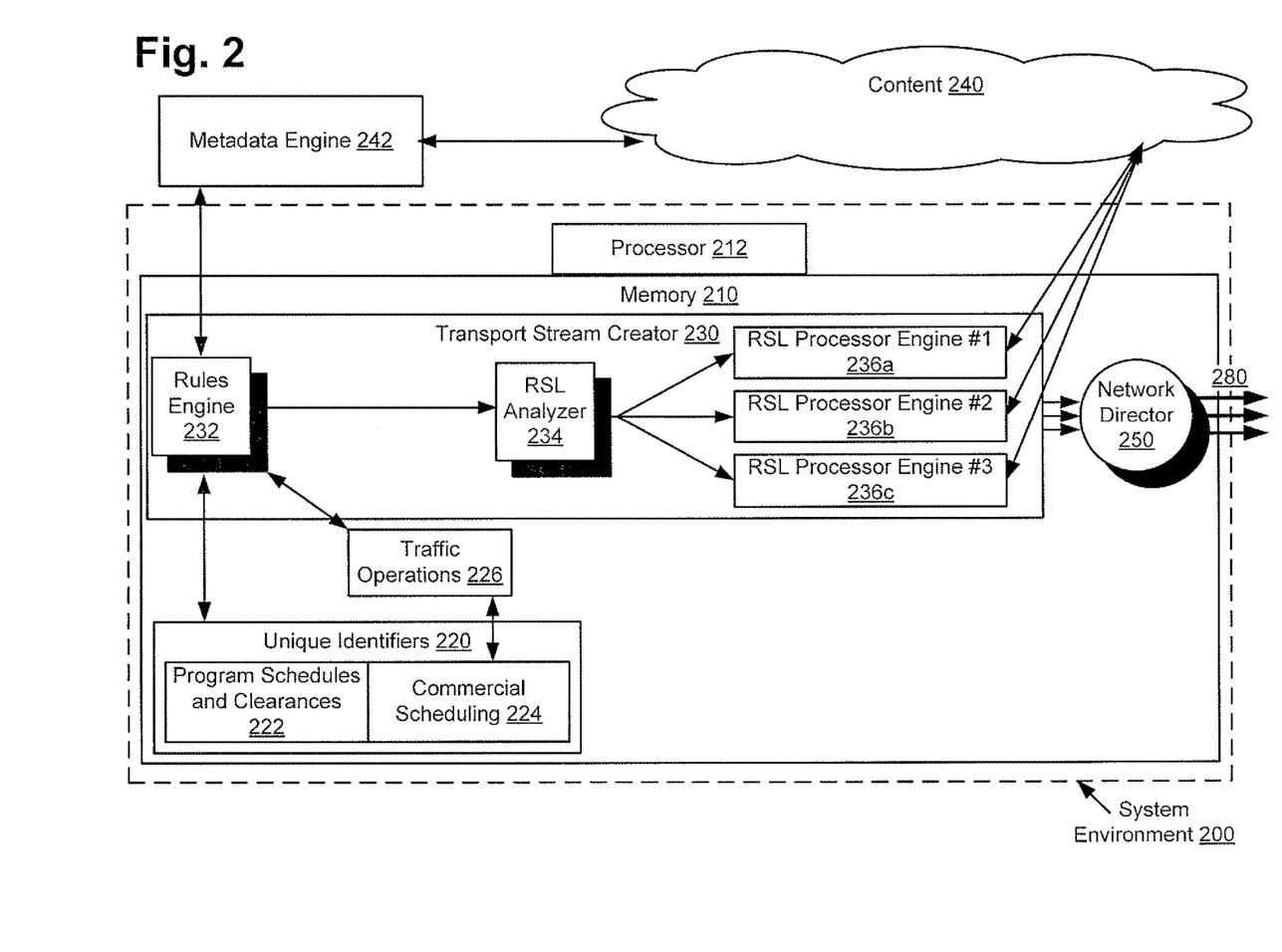
FIG. 2 presents a more detailed example of one implementation of a system for generation of an encoded content transport stream according to metadata.

Turning now to FIG. 2, FIG. 2 provides a more detailed representation of one implementation of a transport stream creator 230 for use in generating an encoded content transport stream. As shown in FIG. 2, system environment 200 includes processor 212 and memory 210 storing UID 220 composed of program schedules and clearances 222 and commercial scheduling 224, traffic operations 226, transport stream creator 230 composed of rules engine 232, RSL analyzer 234, RSL processor engine #1 236a, RSL processor engine #2 236b, and RSL processor engine #3 236c, as well as network director 250. Also shown in FIG. 2 are metadata engine 242 and content 240.

According to the implementation of FIG. 2, processor 212 may access memory 210 in order to execute transport stream creator 230 and network director 250. Processor 212 may execute rules engine 232 of transport stream creator 230 to obtain unique identifiers 220 and metadata from metadata engine 242. Processor 212 may also execute traffic operations 226. Traffic operations 226 may receive data from commercial schedules 224. As discussed in reference to FIG. 1, commercial scheduling 224 may correspond to UID's 220 identifying commercial media content by regional advertising, national advertising, commercial scheduling, or other metadata corresponding to commercial content. Traffic operations 226 may then use information corresponding to commercial scheduling 224 to form commercial scheduling metadata, such as commercial times, locations, or other commercial scheduling metadata. Processor 212 executing rules engine 232 may then obtain commercial scheduling metadata from traffic operations 226. Thus, traffic operations 226 may process information of commercial scheduling metadata from commercial scheduling 224 UID's for rules engine 232. Processor 212 may then execute rules engine to combine the information received from metadata engine 242 and traffic operations 226 as metadata for use with at least one UID 220 to create a RSL.

Continuing in FIG. 2, once rules engine 232 has created an RSL, processor 212 executing transport stream creator 230 will run RSL analyzer 234. RSL analyzer 234 may review the RSL and determine a number of RSL processor engines 236a/236b/236c to process the RSL. RSL analyzer 234 may determine the number of RSL engines depending on priority of the RSL, cost to process the RSL, requirements of the RSL, workload of transport stream creator 230, or other factors. In FIG. 2, RSL processor engine #1 236a, RSL processor engine #2 236b, and RSL processor engine #3 236c are shown by way of example. However, as previously discussed RSL analyzer 234 may determine more or less RSL processor engines are required based upon processing requirements of the RSL, backup requirements, affiliate requirements, or other requirement information.

Once RSL analyzer 234 of FIG. 2 determines a number of RSL processor engines 236a/236b/236c to use, such as RSL processor engine #1 236a, RSL processor engine #2 236b, and RSL processor engine #3 236c, processor 212 executing transport stream creator 230 may run RSL processor engine #1 236a, RSL processor engine #2 236b, and RSL processor engine #3 236c to create an encoded content transport stream from the RSL. RSL processor engine #1 236a, RSL processor engine #2 236b, and RSL processor engine #3 236c may process an RSL and use at least one UID 220 found in the RSL to identify content from content 240. UID's 220 may identify recorded content from content 240, such as recorded television programs, movies, music videos, audio, recorded sports programs, recorded commercial advertising, or any other content previously discussed in reference to unique identifiers 220. RSL processor engine #1 236a, RSL processor engine #2 236b, and RSL processor engine #3 236c may then combine the content from content 240, and the metadata contain in the RSL to create the encoded content transport streams.

Finishing with FIG. 2, processor 212 executing transport stream creator 230 may then execute network director 250 to determine network path 280. Network director 250 is discussed in more detail with reference to FIG. 3.

Figure 3:
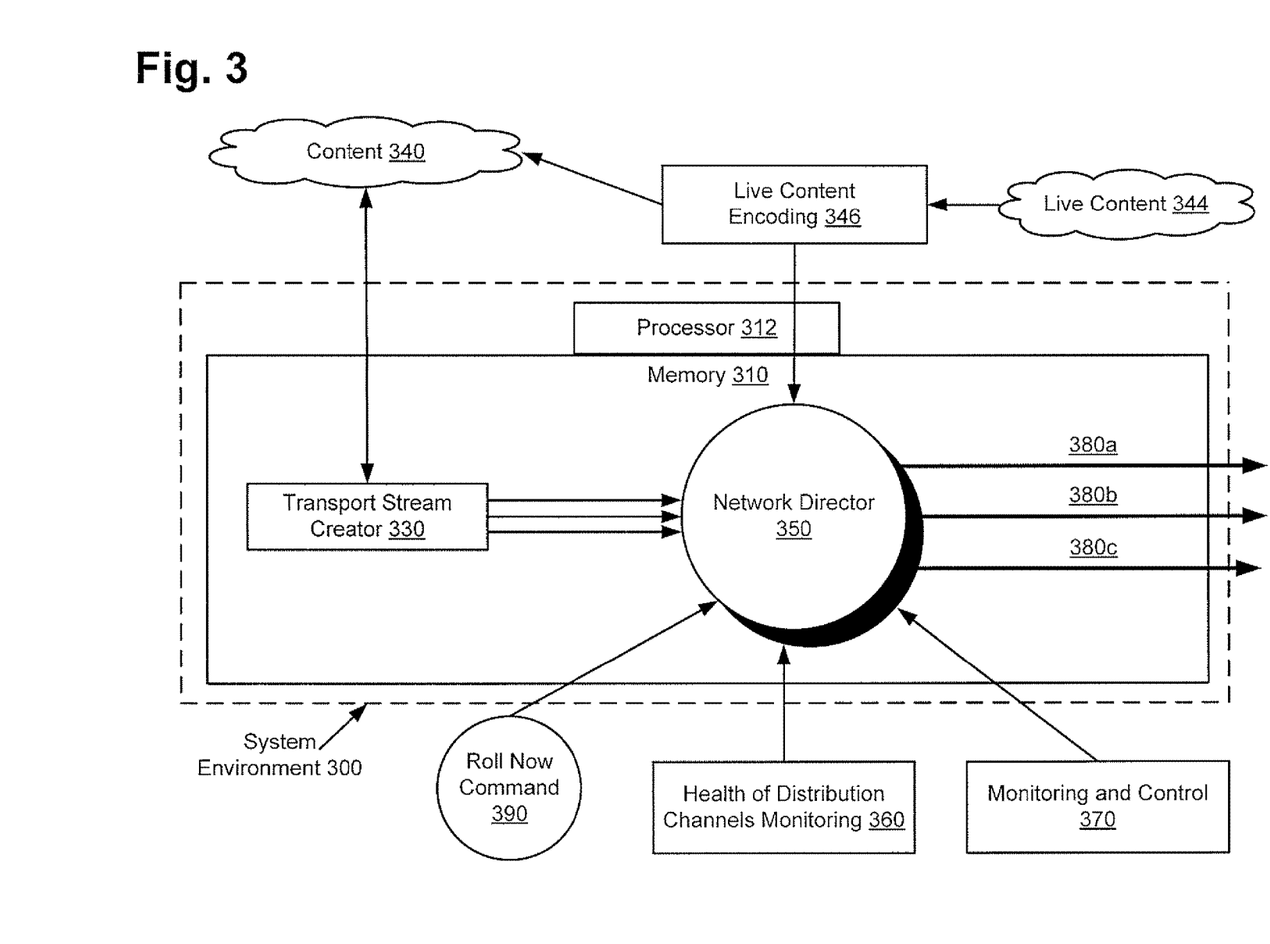
FIG. 3 presents a more detailed example of one implementation of a system for distribution of an encoded content transport stream according to metadata.

Continuing to FIG. 3, FIG. 3 presents a more detailed representation of one implementation of a network stream director 350 for distributing an encoded content transport stream. System environment 300 of FIG. 3 includes processor 312 and memory 310 containing transport stream creator 330 and network director 350. Also shown in FIG. 3 are content 340, live content 344, live content encoding 346, health of distribution channels monitoring 360, monitoring and control 370, network path 380a, network path 380b, network path 380c, and roll now command 390.

Processor 312 may execute transport stream creator 330 to create an encoded content transport stream as discussed in reference to FIGS. 1 and 2. As shown in FIG. 2, three encoded content transport streams are created. However, and as discussed above, more or less encoded content transport streams may be created. After creating the three encoded content transport streams, processor 312 may execute network director 350 to distribute the encoded content transport streams. Processor 312 executing network director 350 may receive information of path selection criteria to determine how many of network path 380a, network path 380b, and network path 380c and which of network path 380a, network path 380b, and network path 380c to use to distribute the encoded content transport stream. Furthermore, while network path 380a, network path 380b, and network path 380c are shown in FIG. 3, it is understood that more or less network paths may be available to and/or required by network director 350 to distribute the encoded content transport streams.

Live content 344 may send data of live content to live content encoding 346 for immediate distribution. Live content encoding 346 may encode live content 344 to create encoded live content. The encoded live content may be sent to content 340 for storage and later use. However, live content encoding 346 may also send encoded live content to network director 350 for distribution. Thus, processor 312 executing network director 350 may receive encoded live content from live content encoding 346 and distribute along network paths 380a/380b/380c.

Processor 312 executing network director 350 may receive data from roll now command 390. Roll now command 390 may correspond to an executable command to play a specific encoded content transport stream, such as one containing commercial advertising content, priority content, or other specified content at the present time or some future time. Thus, for example, roll now command 390 may determine a specific encoded content transport stream should be given priority over another encoded content transport stream currently being distributed.

In another implementation, network director 350 may be receiving encoded live content from live content encoding 346. Therefore, roll now command 390 may determine breaks, such as commercial breaks, to place in the encoded live content if encoded live content is currently being distributed. Roll now command 390 may also correspond to an executable command to play encoded live content from live content encoding 346, such as a live interrupt, placed into an encoded content transport stream currently being distributed. Thus, for example, a live interrupt of breaking news may be placed into a television or commercial encoded content transport stream.

Network director 350 may receive information from health of distribution channels monitoring 360. Information from health of distribution channels 360 may include information corresponding to bandwidth of network path 380*a*, network path 380*b*, and network path 380*c*, delay involved in network path 380*a*, network path 380*b*, and network path 380*c*, reliability of network path 380*a*, network path 380*b*, and network path 380*c*, cost of distribution on network path 380*a*, network path 380*b*, and network path 380*c*, affiliate preference of network path 380*a*, network path 380*b*, and network path 380*c*, or any other information relevant in determining which of network path 380*a*, network path 380*b*, and network path 380*c* to use in distributing the encoded content transport streams or the encoded live content.

Network director 350 may also receive information from monitoring and control 370. Information from monitoring and control 370 may include further information used by network director 350 to determine the availability and status of network path 380*a*, network path 380*b*, and network path 380*c*. Thus, monitoring and control can assist network director 350 in further determining which of network path 380*a*, network path 380*b*, and network path 380*c* to use in distributing the encoded content transport streams or the encoded live content.

Thus, as described above, network director 350 may receive information necessary to distribute the encoded content transport stream on network path 380*a*, network path 380*b*, and network path 380*c*. Such information may come from metadata contained in the RSL, or sources such as live content encoding 346, health of distribution channels monitoring 360, monitoring and control 370, roll now command 390 or other sources.

Once an encoded content transport stream arrives at an affiliate endpoint, the affiliate endpoint may act as a distribution point and distribute content contained in the encoded content transport stream to consumers. An affiliate endpoint may determine which encoded content transport stream to give priority based on metadata contained in the encoded content transport streams and/or live content encoding. After choosing an encoded content transport stream, the affiliate endpoint may then decode the encoded content transport stream into video content and/or audio content for distribution. Thus, affiliate endpoints may control priority and transmission of content, such as television programming, live content, or commercial advertising, based on the metadata transmitted from network director 350 in the encoded content transport streams and/or live content encoding. In another embodiment, the affiliate endpoint may also choose to transmit the content to consumers as they see fit.

FIGS. 1, 2, and 3 will now be further discussed by reference to FIG. 4, which presents flowchart 400 describing an exemplary flowchart illustrating a method for generation and distribution of an encoded content transport stream according to metadata. With respect to the method outlined in FIG. 4, it is noted that certain details and features have been left out of flowchart 400 in order not to obscure the discussion of the inventive features of the present application.

Figure 4:
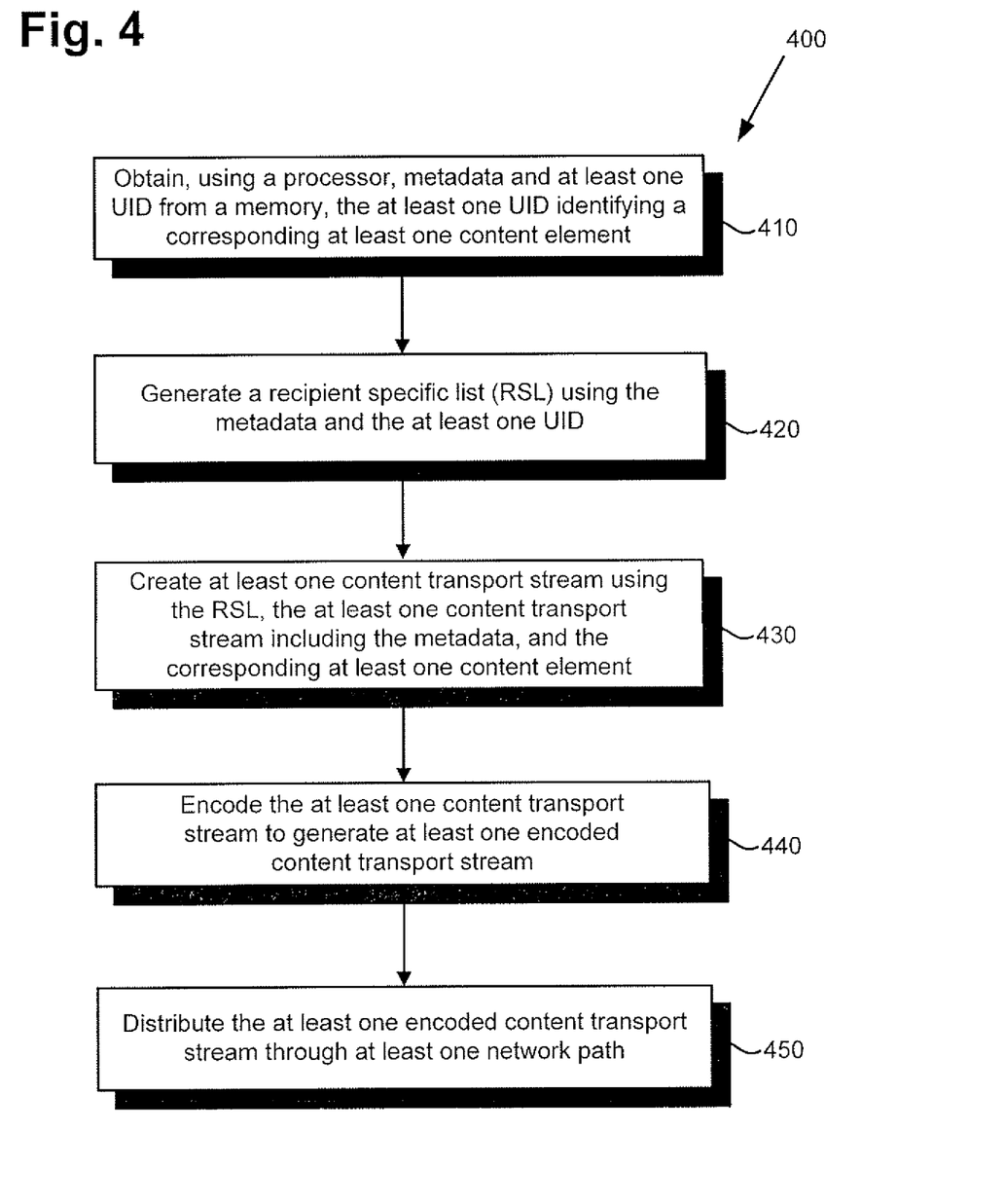
FIG. 4 presents an exemplary flowchart illustrating a method for generation and distribution of an encoded content transport stream, according to one implementation.

Referring to FIG. 4 in combination with FIG. 1, FIG. 2, and FIG. 3, flowchart 400 begins with obtaining metadata and at least one unique identifier 120/220 (UID) from a memory 110/210/310, the at least one UID identifying a corresponding at least one content element (410). The obtaining may correspond to processor 112/212/312 utilizing rules engine 132/232 of transport stream creator 130/230/330 to receive metadata from metadata engine 142/242 and at least one UID 120/220 identifying at least one content element. For example, in one implementation, processor 112/212 may access memory 110/210 and execute rules engine 132/232 to obtain the metadata and at least one UID 120/220.

Flowchart 400 continues by generating a recipient specific list (RSL) using the metadata and the at least one UID (420). The generating may be performed by rules engine 132/232 of transport stream creator 130/230/330, under the control of processor 112/212/312. The RSL may correspond to a playlist of media content including at least one UID 120/220 and metadata from metadata engine 142/242. As previously discussed, UID 120/220 may identify corresponding content elements from content 140/240/340. Furthermore, as previously discussed, metadata may contain metadata corresponding to content 140/240/340. Metadata may correspond to metadata used in directing an encoded content transport stream to the correct affiliate. Metadata may include metadata related to playtime, duration, priority, or other content related metadata.

The method of flowchart 400 continues by creating at least one content transport stream using the RSL, the at least one content transport stream including the metadata and the corresponding at least one identified content elements (430). Creation of the at least one content transport stream using the RSL may be performed by RSL analyzer 134 with RSL processor engine 136 transport stream creator 130, under control of processor 112. The creation of the at least one content transport stream using the RSL may also be performed by RSL analyzer 234 with RSL processor engine #1 236*a*, RSL processor engine #2 236*b*, and RSL processor engine #3 236*c*, of transport stream creator 230, under control of processor 212. As shown in FIG. 1, processor 112 may utilize RSL analyzer 134 to determine at least one RSL processor engine 136 to create the content transport stream using the RSL. However, as shown in FIG. 2, processor 212 may execute RSL analyzer 234 to determine RSL processor engine #1 236*a*, RSL processor engine #2 236*b*, and RSL processor engine #3 236*c* is required to create three content transport streams using the RSL. While three RSL processor engines 236*a*/236*b*/236*c* are shown in FIG. 2, it is understood that more or less RSL processor engines may be required to create the at least one content transport stream from the RSL. The number of RSL processor engines utilized by transport stream creator 130/230 may depend on workload, accommodation requirements, priority of the RSL, assembly requirements, importance or priority of the RSL, or other factors.

Once RSL analyzer 134/234 has determined a number of RSL processor engines (136/236*a*/236*b*/236*c*) to utilize to create the at least one content transport stream, RSL processor engines (136/236*a*/236*b*/236*c*) may utilize the at least one UID of the RSL to identify corresponding content elements from content 140/240. The RSL processor engines (136/236*a*/236*b*/236*c*) may then create the at least one content transport stream using the corresponding at least one content elements and the metadata contained in the RSL. Thus, the at least one content transport stream may contain content elements from content 140/240 and metadata from metadata engine 142/242.

Flowchart 400 continues with encoding the at least one content transport stream to generate at least one encoded content transport stream (440). The encoding may be performed by RSL processor engine 136 of transport stream creator 130, under control of processor 112. The encoding may also be performed by RSL processor engine #1 236a, RSL processor engine #2 236b, and RSL processor engine #3 236c, of transport stream creator 230, under control of processor 212. Once the at least one content transport stream has been created, RSL processor engines (136/236a/236b/236c) may encoded the at least one content transport stream to generate the at least one encoded content transport stream.

The method of flowchart 400 continues with distributing the at least one encoded content transport stream through at least one network path 180/280/380a/380b/380c (450). Distributing the at least one encoded content transport stream may be performed by network director 150/250/350, under control of processor 112/212/312. As shown in FIG. 1, processor 112 may execute network director 150 to determine at least one network path 180 to distribute the at least one encoded content transport stream. However, as shown in FIG. 3, processor 312 may execute network director 350 to determine network path 380a, network path 380b, and network path 380c is required to distribute the at least one encoded content transport stream. As discussed in reference to FIG. 3, network director 150/250/350 may determine the number of network paths 180/280/380a/380b/380c to distribute the based on path selection criteria determined using metadata from metadata engine 142/242 contained in the at least one encoded content transport stream, live content encoding 346, health of distribution channels monitoring 360, monitoring and control 370, or another information source.

In this manner, an encoded content transport stream may be generated and distributed according to metadata corresponding to content stored by a media content supplier. Therefore, media content may be distributed intelligently with less infrastructure and monitoring of the media content and distribution channels.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for use by a system including a processor and a memory, the memory having at least one unique identifier (UID) identifying a corresponding at least one content element, for generation and distribution of at least one encoded content transport stream, the method comprising:

obtaining, using the processor, metadata and the at least one UID from the memory, the at least one UID identifying the corresponding at least one content element;

generating, using the processor, a recipient specific list (RSL) using the metadata and the at least one UID, wherein the RSL corresponds to a playlist of media content for an affiliate endpoint recipient of the encoded content transport stream, and wherein the RSL includes at least a commercial scheduling metadata corresponding to at least a commercial content;

delivering the RSL to an RSL analyzer to determine, based on a priority of the RSL, a number of one or more RSL processor engines, wherein determining the number of the one or more RSL processor engines is further based on at least one of a cost to process the RSL, requirements of the RSL, and a workload of a transport stream creator, and wherein the metadata includes priority information for determining the priority of the at least one encoded content transport stream;

creating, using the processor, at least one content transport stream using the RSL, the at least one content transport stream including the metadata and the corresponding at least one content element, wherein the metadata includes at least one of a name and a location of the affiliate endpoint recipient;

encoding, using the processor, the at least one content transport stream to generate the at least one encoded content transport stream; and distributing, using the processor, the at least one encoded content transport stream through at least one network path to the affiliate endpoint recipient for further distribution by the affiliate endpoint recipient to consumers of the affiliate endpoint recipient;

wherein the creating uses the determined number of one or more RSL processor engines, and wherein determining the number of the one or more RSL processor engines is further based on at least one of a cost to process the RSL, requirements of the RSL, and a workload of a transport stream creator, and wherein the metadata includes priority information for determining a priority of the at least one encoded content transport stream.

2. The method of claim 1, wherein the metadata includes destination points for the at least one encoded content transport stream.

3. The method of claim 1, wherein the one or more RSL processor engines further performs the encoding of the at least one content transport stream.

4. The method of claim 1, wherein prior to the distributing of the at least one encoded content transport stream, the method further comprises determining the at least one network path according to one or more path selection criteria.

5. The method of claim 1, wherein the corresponding at least one content element includes television programming.

6. The method of claim 1, wherein the corresponding at least one content element is one of a movie media content, a sports media content, a recorded live media content, and a music content.

7. A system for generation and distribution of at least one encoded content transport stream, the system comprising:

a memory including:

at least one unique identifier (UID), the at least one UID identifying a corresponding at least one content element;

a transport stream creator; and a network director;
a processor for executing the transport stream creator to:
obtain metadata and the at least one UID from the memory;
generate a recipient specific list (RSL) using the metadata and the at least one UID, wherein the RSL corresponds to a playlist of media content for an affiliate endpoint recipient of the encoded content transport stream, and wherein the RSL includes at least a commercial scheduling metadata corresponding to at least a commercial content;
deliver the RSL to an RSL analyzer to determine, based on a priority of the RSL, a number of one or more RSL processor engines, wherein determining the number of the one or more RSL processor engines is further based on at least one of a cost to process the RSL, requirements of the RSL, and a workload of a transport stream creator, and wherein the metadata includes priority information for determining the priority of the at least one encoded content transport stream;
create at least one content transport stream using the RSL, the at least one content transport stream including the metadata and the corresponding at least one content element, wherein the metadata includes at least one of a name and a location of the affiliate endpoint recipient; and
encode the at least one content transport stream to generate the at least one encoded content transport stream;
wherein the creating uses the determined number of one or more RSL processor engines, and wherein determining the number of the one or more RSL processor engines is further based on at least one of a cost to process the RSL, requirements of the RSL, and a workload of a transport stream creator, and wherein the metadata includes priority information for determining a priority of the at least one encoded content transport stream;
a network director, under the control of the processor, configured to:
distribute the at least one encoded content transport stream through at least one network path to the affiliate endpoint recipient for further distribution by the affiliate endpoint recipient to consumers of the affiliate endpoint recipient.

8. The system of claim 7, wherein the metadata includes destination points for the at least one encoded content transport stream.

9. The system of claim 7, wherein the one or more RSL processor engines further performs the encoding of the at least one content transport stream.

10. The system of claim 7, wherein the network director is further configured to determine the at least one network path according to one or more path selection criteria.

11. The system of claim 7, wherein the corresponding at least one-content element includes television programming.

12. The system of claim 7, wherein the corresponding at least one content element is one of a movie media content, a sports media content, a recorded live media content, and a music content.

13. A system for generation and distribution of at least one encoded content transport stream, the system comprising:
a memory including:
at least one unique identifier (UID), the at least one UID identifying a corresponding at least one content element;
a transport stream creator;
an RSL analyzer;
at least one RSL processor engines; and
a network director;
a processor for executing the transport stream creator to:
obtain metadata and the at least one UID from the memory; and
generate a recipient specific list (RSL) using the metadata and the at least one UID, wherein the RSL corresponds to a playlist of media content for an affiliate endpoint recipient of the encoded content transport stream, and wherein the RSL includes at least a commercial scheduling metadata corresponding to at least a commercial content;
the processor further for executing the RSL analyzer to:
receive the RSL; and
deliver the RSL to an RSL analyzer to determine, based on a priority of the RSL, a number of one or more RSL processor engines, wherein determining the number of the one or more RSL processor engines is further based on at least one of a cost to process the RSL, requirements of the RSL, and a workload of a transport stream creator, and wherein the metadata includes priority information for determining the priority of the at least one encoded content transport stream;
create at least one content transport stream using the RSL, the at least one content transport stream including the metadata and the corresponding at least one content element, wherein the metadata includes at least one of a name and a location of the affiliate endpoint recipient; and
encode the at least one content transport stream to generate the at least one encoded content transport stream;
wherein the creating uses the determined number of one or more RSL processor engines, and wherein determining the number of the one or more RSL processor engines is further based on at least one of a cost to process the RSL, requirements of the RSL, and a workload of a transport stream creator, and wherein the metadata includes priority information for determining a priority of the at least one encoded content transport stream;
the processor further for executing the network director to:
distribute the at least one encoded content transport stream through at least one network path to the affiliate endpoint recipient for further distribution by the affiliate endpoint recipient to consumers of the affiliate endpoint recipient.

14. The system of claim 13, wherein the network director is further configured to determine the at least one network path according to one or more path selection criteria.

* * * * *

UNITED STATES PATENT AND TRADEMARK OFFICE
CERTIFICATE OF CORRECTION

PATENT NO. : 10,165,026 B2
APPLICATION NO. : 13/727302
DATED : December 25, 2018
INVENTOR(S) : Chiarulli et al.

It is certified that error appears in the above-identified patent and that said Letters Patent is hereby corrected as shown below:

In the Claims

Column 8, Lines 36-43, Claim 1, delete ", and wherein determining the number of the one or more RSL processor engines is further based on at least one of a cost to process the RSL, requirements of the RSL, and a workload of a transport stream creator, and wherein the metadata includes priority information for determining a priority of the at least one encoded content transport stream".

Column 9, Lines 32-39, Claim 7, delete ", and wherein determining the number of the one or more RSL processor engines is further based on at least one of a cost to process the RSL, requirements of the RSL, and a workload of a transport stream creator, and wherein the metadata includes priority information for determining a priority of the at least one encoded content transport stream".

Column 10, Lines 43-50, Claim 13, delete ", and wherein determining the number of the one or more RSL processor engines is further based on at least one of a cost to process the RSL, requirements of the RSL, and a workload of a transport stream creator, and wherein the metadata includes priority information for determining a priority of the at least one encoded content transport stream".

Signed and Sealed this
Nineteenth Day of May, 2020

Andrei Iancu
*Director of the United States Patent and Trademark Office*